United States Patent
Allgeier et al.

(10) Patent No.: US 11,922,146 B2
(45) Date of Patent: *Mar. 5, 2024

(54) SYSTEMS AND METHOD FOR CREATING ENTERPRISE SOFTWARE

(71) Applicant: Nextworld, LLC, Greenwood Village, CO (US)

(72) Inventors: Axel Allgeier, Parker, CO (US); Vito Solimene, Highlands Ranch, CO (US)

(73) Assignee: Nextworld, LLC, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,439

(22) Filed: Mar. 7, 2023

(65) Prior Publication Data

US 2023/0359446 A1 Nov. 9, 2023

Related U.S. Application Data

(63) Continuation of application No. 16/329,938, filed as application No. PCT/US2018/050452 on Sep. 11, 2018, now Pat. No. 11,630,650.

(60) Provisional application No. 62/556,891, filed on Sep. 11, 2017.

(51) Int. Cl.
| | |
|---|---|
| *G06F 8/10* | (2018.01) |
| *G06F 8/20* | (2018.01) |
| *G06F 8/36* | (2018.01) |
| *G06F 8/65* | (2018.01) |
| *G06Q 10/101* | (2023.01) |
| *H04L 67/00* | (2022.01) |
| *H04L 67/50* | (2022.01) |

(52) U.S. Cl.
CPC ............... *G06F 8/36* (2013.01); *G06F 8/10* (2013.01); *G06F 8/20* (2013.01); *G06F 8/65* (2013.01); *G06Q 10/101* (2013.01); *H04L 67/34* (2013.01); *H04L 67/535* (2022.05)

(58) Field of Classification Search
None
See application file for complete search history.

(56) References Cited

U.S. PATENT DOCUMENTS

| 9,009,334 B1 * | 4/2015 | Jenkins ................... G06F 21/50 709/219 |
| 9,612,920 B2 * | 4/2017 | Sygulla ............... G06F 11/1469 |
| 10,140,098 B2 * | 11/2018 | Lovisa ................. H04L 67/567 |

(Continued)

*Primary Examiner* — Philip Wang

(57) ABSTRACT

Various embodiments of the present technology empower business domain experts to create "no-code" enterprise applications with a variety of features (e.g., workflow, multi-currency, etc.). By using the tools of various embodiments, the domain expert just has to know the business and not how to code in order to create enterprise applications. In some embodiments, the domain expert can access a tool that allows the domain expert to convey intent and desires instead of providing code. The intent and desire of the domain expert can then be abstracted, translated, and stored as a metadata representation. The metadata representation can then be used to automatically generate appropriate code artifacts for the applications. The code artifacts can include snippets of code written in a variety of languages. These code artifacts can then be wrapped, using a runtime engine for example, to create the application which can be distributed to the end-users.

20 Claims, 7 Drawing Sheets

(56) References Cited

U.S. PATENT DOCUMENTS

| | | | | |
|---|---|---|---|---|
| 10,223,076 | B1* | 3/2019 | Owen | G06F 8/33 |
| 11,514,187 | B1* | 11/2022 | DiGregoria | H04L 63/102 |
| 2005/0149868 | A1* | 7/2005 | Katayama | G06F 8/38 |
| | | | | 715/700 |
| 2009/0293005 | A1* | 11/2009 | Hooyman | G06F 8/38 |
| | | | | 715/762 |
| 2016/0202959 | A1* | 7/2016 | Doubleday | G06F 8/71 |
| | | | | 717/107 |
| 2016/0378437 | A1* | 12/2016 | Patino-Bueno | G06F 3/0484 |
| | | | | 717/105 |
| 2018/0143809 | A1* | 5/2018 | Zang | G06F 8/35 |
| 2019/0004823 | A1* | 1/2019 | Walker | G06F 11/3438 |
| 2019/0079754 | A1* | 3/2019 | Makkar | G06N 5/022 |

* cited by examiner

SYSTEMS AND METHOD FOR CREATING ENTERPRISE SOFTWARE

CROSS-REFERENCE TO RELATED APPLICATIONS

This application is a continuation of and claims priority to U.S. application Ser. No. 16/329,938, filed Mar. 1, 2019, titled "SYSTEMS AND METHODS FOR CREATING ENTERPRISE SOFTWARE," which claims priority to PCT application No. PCT/US2018/050452 filed on Sep. 11, 2018, and U.S. Provisional Application Ser. No. 62/556,891 filed Sep. 11, 2017, which are incorporated herein by reference in their entirety for all purposes.

BACKGROUND

Businesses routinely develop custom software for a variety of purposes. For example, custom software can be used to streamline various projects, automate routine functions, meet client demands, and provide features that improve the experiences of the users. Unfortunately, developing custom software for specific business purposes can quickly become a complex task that often includes writing many lines of source code in a suitable programming language. The individuals who understand the business needs for the software often lack the coding experience to create enterprise level software. As such, these individuals have to work with software development specialists that must write, test, and maintain the code.

Once the custom software has been created, there are many situations where the software may need to be updated or rewritten. For example, the business may specify new features, a new or preferred programming language may arise, new security features may be expected, or the like. In addition to regular updates, providing a consistent software experience across many platforms (that may be changing themselves) can be challenging. To make matters worse, the software may include many lines of code along with a variety of functions and modules which need to be evaluated and potentially rewritten to avoid any undesired issues that may arise from revisions to one part of the code.

This process of testing and evaluating the new software can take a significant amount of time. Depending on the complexity of the software and the amount of changes, the process may take several weeks or longer before the revised version can be deployed with confidence that the updated software will work as desired. This entire software development process can be discouraging to the individuals without the coding experience that have to specify the high-level functionality and then wait for the software to be created and tested by others. As such, there are a number of challenges and inefficiencies created in traditional software development.

SUMMARY

Systems and methods are described for creating, managing, and enabling non-coders (e.g., domain experts) to create enterprise software. Some embodiments provide for a method for operating a cloud-based software platform. In accordance with various embodiments, the cloud-based software platform can automatically generate a set of code snippets. Before the code snippets are generated, a non-coder can provide a set of specifications (e.g., functional specifications, stylistic specifications, security-based specifications, etc.) using an application design tool. The design tool can abstract the set of specifications set forth by non-coder for the creation of a customized application. In some instances, the application design tool may impose certain functionality or options with the selection of some features. The set of specifications set forth by the domain expert typically will not include any lines of code.

Once the code snippets have been created, the customized application can be generated (e.g., by creating a wrapper around the set of code snippets). Then, the customized application can be accessed by the end users. As the end-users interact with the customized applications, the customized application can report various transactional data (e.g., business data, user activity and the like) to the cloud-based software platform. The transactional data received from the customized application can be recorded and the cloud-based software platform can monitor for a request from the customized application to return the customized application to previous state. A subset of the transactional data that will return the customized application to a previous state can be identified and then returned to the customized application In accordance with some embodiments, the customized application is one of multiple applications generated by the cloud-based software platform. In addition, the cloud-based software platform may provide a set of common services to each of the multiple applications. For example, the cloud-based platform may provide administrative service, application programing interfaces, and security services.

As technology evolves, security updates are received, new languages are developed and the like, the customized software applications can be easily updated by the cloud-based software platform. For example, in order to update various applications, some embodiments only need an update to a code generator. Once the update to the code generator has been implemented, the cloud-based software platform can identify any code snippets that need to be need to be updated and generate updated code snippets using the code generator. The customized application can then be regenerated based on the updated code snippets. In addition, some embodiments allow for the linking of a set of business rules associated with the customized application and the transactional data. For example, the transactional data can be linked with business data, in some embodiments, by associating a state of workflow.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

Figure 1:
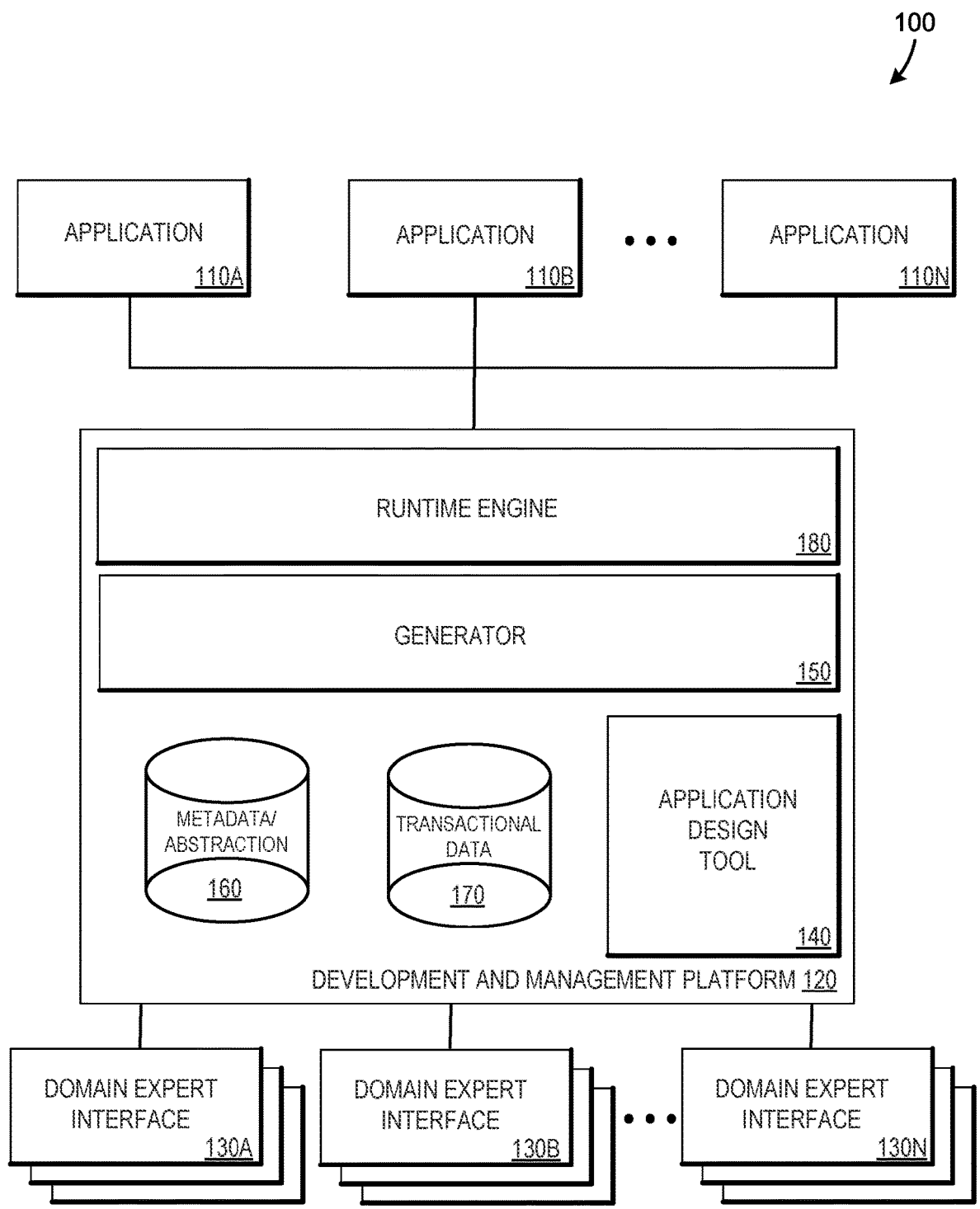
FIG. 1 illustrates an example of an operating environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to tools for creating, managing, and enabling enterprise software. More specifically, some embodiments relate to a tool that empowers non-coders to create industrial strength, enterprise applications. Generally, domain experts such as lawyers, accountants, manufacturing experts, marketing experts and the others with specific skill sets do not have the expertise to create industrial strength enterprise applications. This deficiency in coding skills creates a need for the domain experts to hire software development experts and convey functional specifications that describe how the application or customized software should behave. This process and be time consuming and expensive.

In contrast, various embodiments of the present technology empower business domain experts to create "no-code" enterprise applications (e.g., with features such as workflow integration, multi-currency, etc.). By using the tools of various embodiments, the domain expert just has to know the business and not how to code or create enterprise applications. In some embodiments, the domain expert can access a tool that can be used to build the software application. Instead of requiring the domain expert to provide code in one or more languages, some embodiments of the tool allow the domain expert to convey intent and desires. For example, the tool may provide a variety of stylistic templates and/or offer a selection of a variety of functionality to identify the intent and desires of the domain expert. As another example, the tool may provide graphical user interfaces that allow the domain expert to provide a general design and indication of functionality.

Once the domain expert has specified the intent and desire via the tool, the information may be translated and stored in metadata. The metadata representation of the intent and desire of the domain expert can then be used to automatically generate appropriate code artifacts for the applications. The code artifacts can include snippets of code that can be written in a variety of languages including, but not limited to, Angular, CSS, HTML, JavaScript, and the like. These code artifacts can then be wrapped, using a runtime engine for example, to create the application which can be distributed to the end-users.

Various embodiments of the present technology provide for a wide range of technical effects, advantages, and/or improvements to computing systems and components. For example, various embodiments include one or more of the following technical effects, advantages, and/or improvements: 1) provide unique tools that allow a domain expert to convey intent and desire regarding the design and functionality of the design of a customized software application without requiring the domain expert to write any code; 2) creation of an abstraction layer so that as new features or technology are introduced (or some other changes) the generator can be updated and quickly regenerate code for all applications; 3) allows non-coders to create enterprise level software applications; 4) automatically monitors and record application states; 5) use unconventional and non-routine operations as part of creating, updating, and monitoring custom software applications; 6) unique systems and methods that allow behind the scene monitoring and recoding of activity (e.g., transactional activity or business activity); 7) persisting of client activity; 8) ubiquitous auto save; 9) management of business workflow lifecycles; 9) managing the state of the transaction without the user having to manage the activity; and/or 10) creation, modification, and reuse of code artifacts and snippets in creation of enterprise level software. Some embodiments include additional technical effects, advantages, and/or improvements to computing systems and components.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to various computing architectures, embodiments of the present technology are equally applicable to various other cloud-based techniques for creating software applications.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of an operating environment 100 in which some embodiments of the present technology may be utilized. As illustrated in FIG. 1, operating environment 100 may include one or more applications 110A-110N (e.g., running on client devices such as a mobile phone, tablet computer, mobile media device, mobile gaming device, vehicle-based computer, wearable computing device, etc.), cloud-based development and management platform 120, and domain expert interfaces 130A-130N accessed via client devices. In accordance with various embodiments, the client devices can include a variety of network communication components that enable the client devices to communicate with remote servers or other portable electronic devices by transmitting and receiving wireless signals using licensed, semi-licensed or unlicensed spectrum over a communications network. In some cases, the communications network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Development and management platform 120 can include a variety of components such as, but not limited to, application design tool 140, generator 150, metadata/abstraction database 160, transactional data base 170, and runtime engine 180. Development and management platform 120 can provide a variety of features including, but not limited to, behind the scene monitoring activity (transaction or business) and recording, persisting client activity, ubiquitous autosave, business workflow and approval lifecycles, error correction at the business level, management of the state of the transaction without the user having to manage the activity, tracking posted and unposted transactions (e.g., business state), and the like. Once an application is created, some of the features are only present when loaded onto the runtime engine 180 that can include a unified transaction engine that combines awareness of database transaction state along with business transaction states. As a result, the end-user and/or developer does not have to be concerned about the underlying differences between the database transaction state and business transaction states, and can focus on where their transaction is in its lifecycle.

As illustrated in FIG. 1, the domain expert interfaces 130A-130N can allow business domain experts to access application design tool 140. Using application design tool 140, the business domain experts can convey and specify application functionality and interface design (e.g., layouts, color schemes, etc.) for creating enterprise applications (e.g., workflow, multi-currency, etc.) without writing any code. As a result, the domain expert just has to know the business and not how to code or create enterprise applications. In some embodiments, application design tool 140 may provide a variety of stylistic templates and/or offer a selection of a variety of functionality to identify the intent and desires of the domain experts.

Once the domain experts have specified the intent and desire via application design tool 140, the information representing the intent and design may be translated and stored as metadata. In some embodiments, the metadata representation of the intent and desire of the domain expert can be stored in metadata/abstraction database 160. Generator 150 can access the metadata and abstraction data in database 160 and automatically generate appropriate code artifacts for applications 110A-110N. The code artifacts can include snippets of code that can be written in a variety of languages including, but not limited to, Angular, CSS, HTML, JavaScript, and the like. Once generated, these code artifacts can then be wrapped using a runtime engine 180 to create applications 110A-110N which can be distributed to, or accessed by, the end-users. As end-users interact with application 110A-110N, runtime engine 180 can monitor, track, and/or record the states and other transactional data in transactional database 170.

Figure 2:
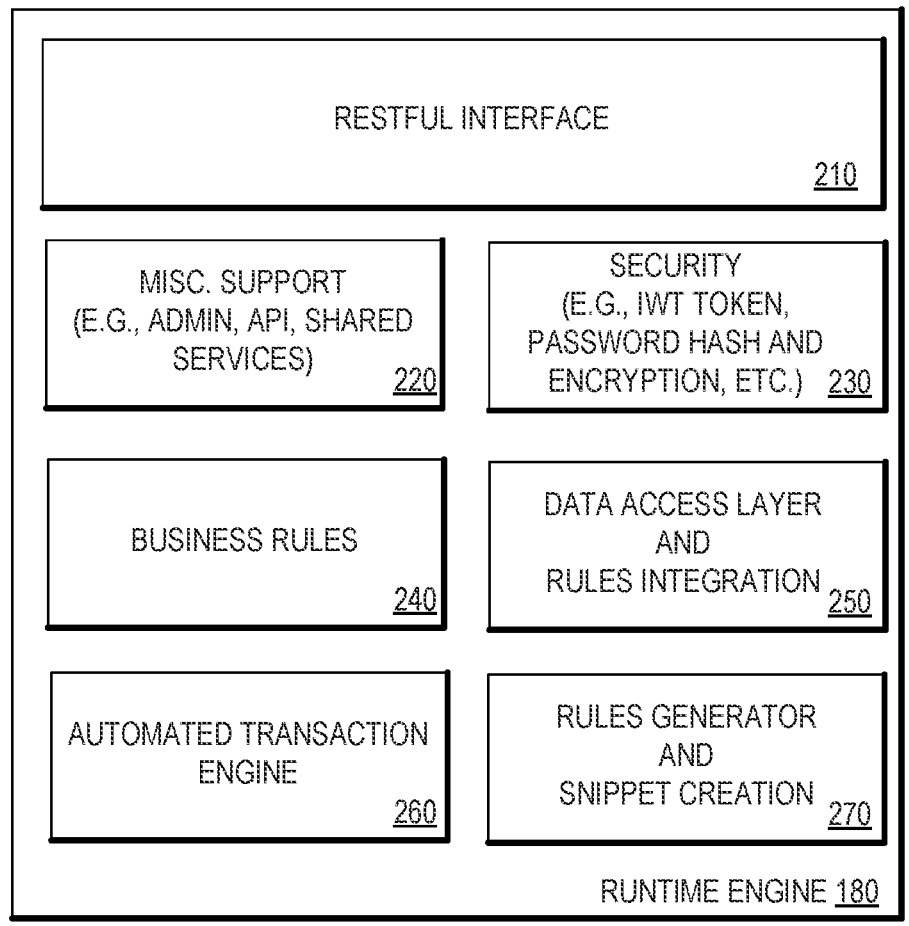
FIG. 2 illustrates a set of components that may be present within a development engine according to one or more embodiments of the present technology.

FIG. 2 illustrates a set of components that may be present within a runtime engine 180 according to one or more embodiments of the present technology. According to the embodiments shown in FIG. 2, the runtime engine 180 can include restful interface 210, a miscellaneous support module 220, a security module 230, a business rule module 240, a data access layer and rules integration module 250, an automated transaction engine 260, and a rules generator and snippet creation module 270. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, the functionality of rules generator and snippet creation module 270 may be split into two modules or systems.

While not shown in FIG. 2, some embodiments of runtime engine 180 may include memory that can be any device, mechanism, or populated data structure used for storing information. In accordance with some embodiments of the present technology, the memory can encompass any type of, but is not limited to, volatile memory, nonvolatile memory and dynamic memory. For example, the memory can be random access memory, memory storage devices, optical memory devices, media magnetic media, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, the memory may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory.

Moreover, the memory may be used to store instructions for running one or more applications or modules on one or more processor(s) (not shown). For example, the memory could be used in one or more embodiments to house all or some of the instructions needed to execute the functionality of restful interface 210, a miscellaneous support module 220, a security module 230, a business rule module 240, a data access layer and rules integration module 250, an automated transaction engine 260, and a rules generator and snippet creation module 270.

Runtime engine 180 can be used to generate each customized application and can also provide a variety of different services and functions beyond those found in the customized applications. In some embodiments, each of the customized applications interface directly with runtime engine 180 using restful interface 210. For example, restful interface 210 can provide a uniform interface for receiving, sending and process messages from the applications and other system components. Using restful interface 210, the application can gain access to a variety of functions that hosted on runtime engine 180.

Some embodiments use a uniquely created layer that sits on top of the language that runs the applications. This layer provides the additional functionality to the software applications by providing commonly expected features to the various applications. For example, the layer may provide for currency conversion, accounting, security, APIs, and the like. Miscellaneous support module 220 and security module 230 can offer a host of functions that can be used by the applications. For example, miscellaneous support module 220 can provide a variety of functions such as administrative functions, APIs, shared services, and the like. Similarly, security module 230 can be used to provide a variety of security functions needed by runtime engine 180. These can include, but are not limited to, JSON Web Token (JWT) handler, password hashing, encryption, decryption, and other security features that may be utilized in various embodiments.

In accordance with some embodiments, the domain expert may specify not only code functionality and stylistic design, but may also specify customized business rules. These business rules can identify workflow, data access restrictions, business organizational structure, and/or other specifications that may be unique to the business that requested the customized application. Business rule module 240 can translate the generic and customized business rules available to each application in to data structures or code that can be used by other system components. For example, data access layer and rules integration module 250 can use these rules for accessing transactional and business data.

In accordance with various embodiments, application transactions (e.g., user interactions with the application, data requests, etc.) can be routed through runtime engine 180. Runtime engine 180 can use automated transaction engine 260 to monitor, track, and/or record the transactions from one or more applications. As a result, automated transaction engine 260 provides a unified engine that links technical transaction states and business transaction states. In some embodiments, runtime engine 180 may include more than one automated transaction engine 260. The number of automated transaction engine may dynamically expand or contract based on volume, timing, and the like.

The transactions monitored by automated transaction engine 260 can include anything that touches data or involves some type of business transaction. In some embodiments, automated transaction engine 260 can link technical transaction states (e.g., data access) with business transaction states (e.g., workflow). In some embodiments, the transactions and user interactions with the applications are tracked and can be restored within an application as needed. This can provide not only auto save type features to each application, whether specified by the domain expert or not while using the application design tool. In addition, this type of tracking can be used for versioning and rolling back data.

Still yet, since all transactions from one or more applications can be monitored and/or recorded by automated transaction engine 260, automated transaction engine 260 can create logs for various types of audits.

In some embodiments, automated transaction engine 260 can identify steps within the workflow and accordingly tag and associate the identified workflow step as part of the transaction data. For example, as if the transaction includes an order placement, automated transaction engine, can monitor the order placement though a lifecycle (e.g., pending, approved, shipped, error, etc.).

Rules generator and snippet creation module 270, in accordance with various embodiments can access the metadata and abstraction data created from the domain expert inputs. Using the metadata and abstraction data along with the business rule, rules generator and snippet creation module 270 can automatically generate appropriate code artifacts for the customized applications designed by the domain experts. The code artifacts can include snippets of code that can be written in a variety of languages including, but not limited to, Angular, CSS, HTML, JavaScript, and the like. Once generated, these code artifacts can then be wrapped to create the custom applications requested by the domain experts.

Figure 3:
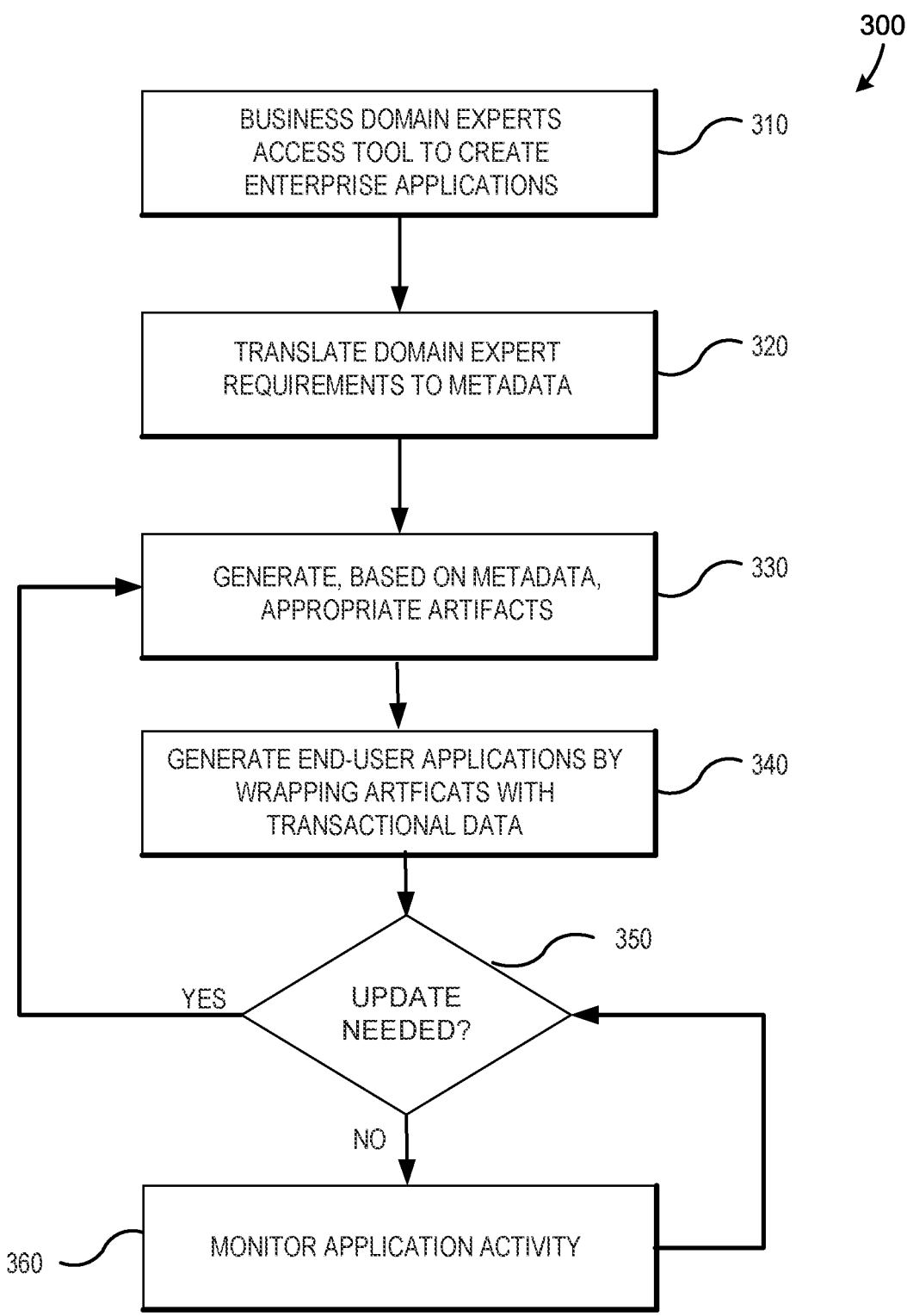
FIG. 3 is a flowchart illustrating a set of operations for generating end-user applications according to one or more embodiments of the present technology.

FIG. 3 is a flowchart illustrating a set of operations 300 for generating end-user applications according to one or more embodiments of the present technology. As illustrated in FIG. 3, access operation 310 monitors for business domain experts to access an application design tool to create enterprise applications. The tool is launched and the domain experts are able to convey the intent, desires, or requirements without having to write any code. Translation operation 320 translates the intent, desires, or requirements into a metadata or abstraction layer representation. Generation operation 330 then generates, based on the metadata and abstraction, the appropriate code artifacts. Then wrapping operation 340 can generate the end-user applications by wrapping the artifacts with any data (e.g., transactional data) needed to create the application. The application can then be published for use.

Using determination operation 350, a determination can be made as to whether the applications may need any updates. In some embodiments, the updates may be minor changes to the code to fix bugs or security issues. As another example, the updates may be used to provide additional enterprise features that have become standardized or expected. Still yet, some updates may require a major shift of the current coding language or paradigm. When determination operation 350 determines that an application needs to be updated, determination operation 350 can branch to generation operation 330 where updated code artifacts can be generated. When determination operation 350 determines that an application does not need to be updated, determination operation 350 can branch to monitoring operation 360 where application activity is monitored.

Figure 4:
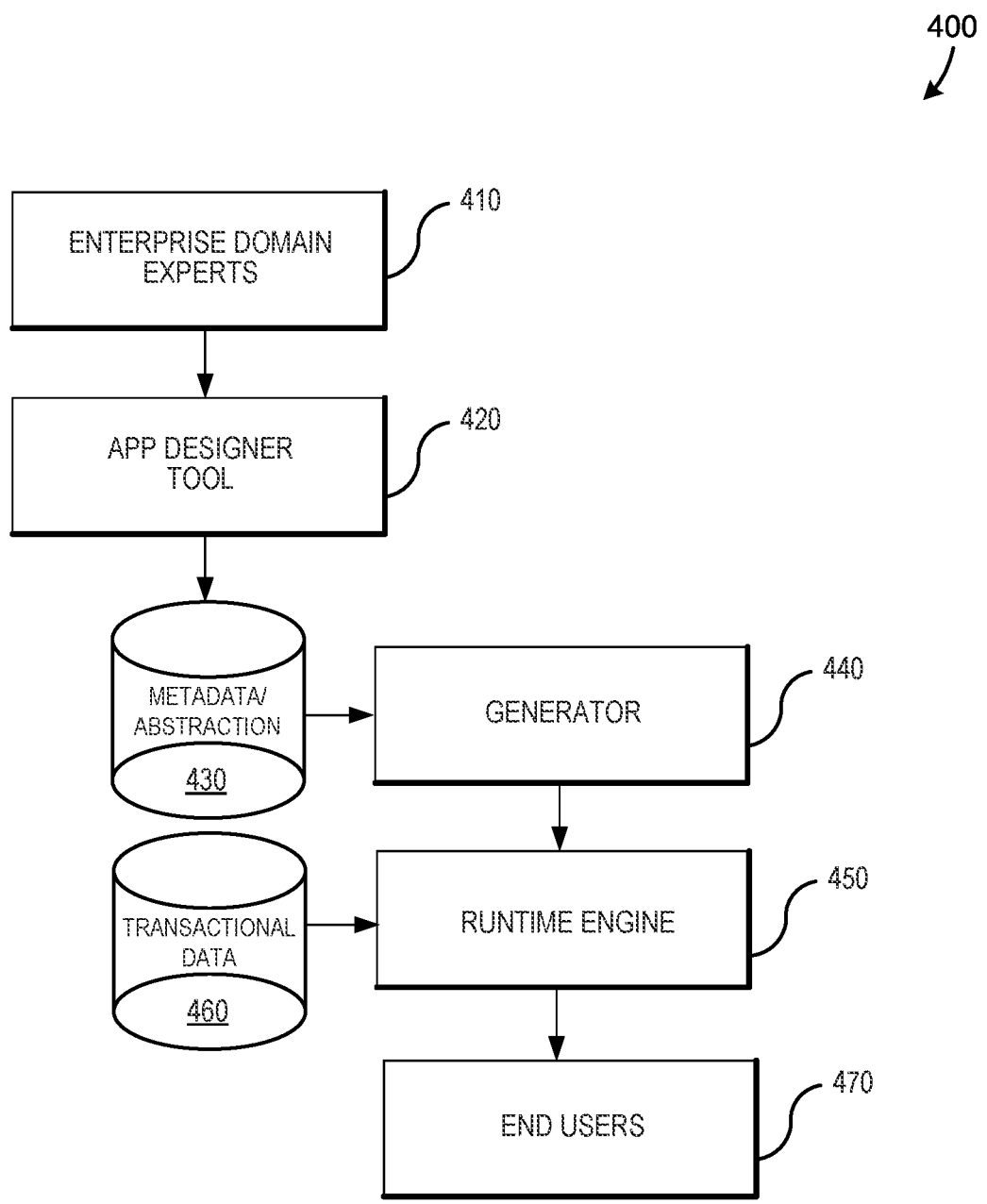
FIG. 4 illustrates the development flow within a software development platform according to one or more embodiments of the present technology.

FIG. 4 illustrates the development flow 400 within a software development platform according to one or more embodiments of the present technology. As illustrated in FIG. 4, the business domain experts 410 can access the application designer tool 420 and specify functionality and stylistic designs of the application. This information can be abstracted into a set of metadata and stored in database 430. Using the abstracted description of the specified functionality and stylistic design, generator 440 can generate code snippets which can be used by runtime engine 450 along with transactional data 460 to create the customized applications for end-users 470. Note that the abstraction of the desired functionality and stylistic design allows generator 440 to easily update the applications as new technological developments and/or best practices evolve. Instead of a developer having to rewrite the entire code for every application, generator 440 can be updated and the abstraction turned into new code snippets that comply with the new developments. Moreover, the applications can leverage a variety of services provided by runtime engine 450.

Figure 5:
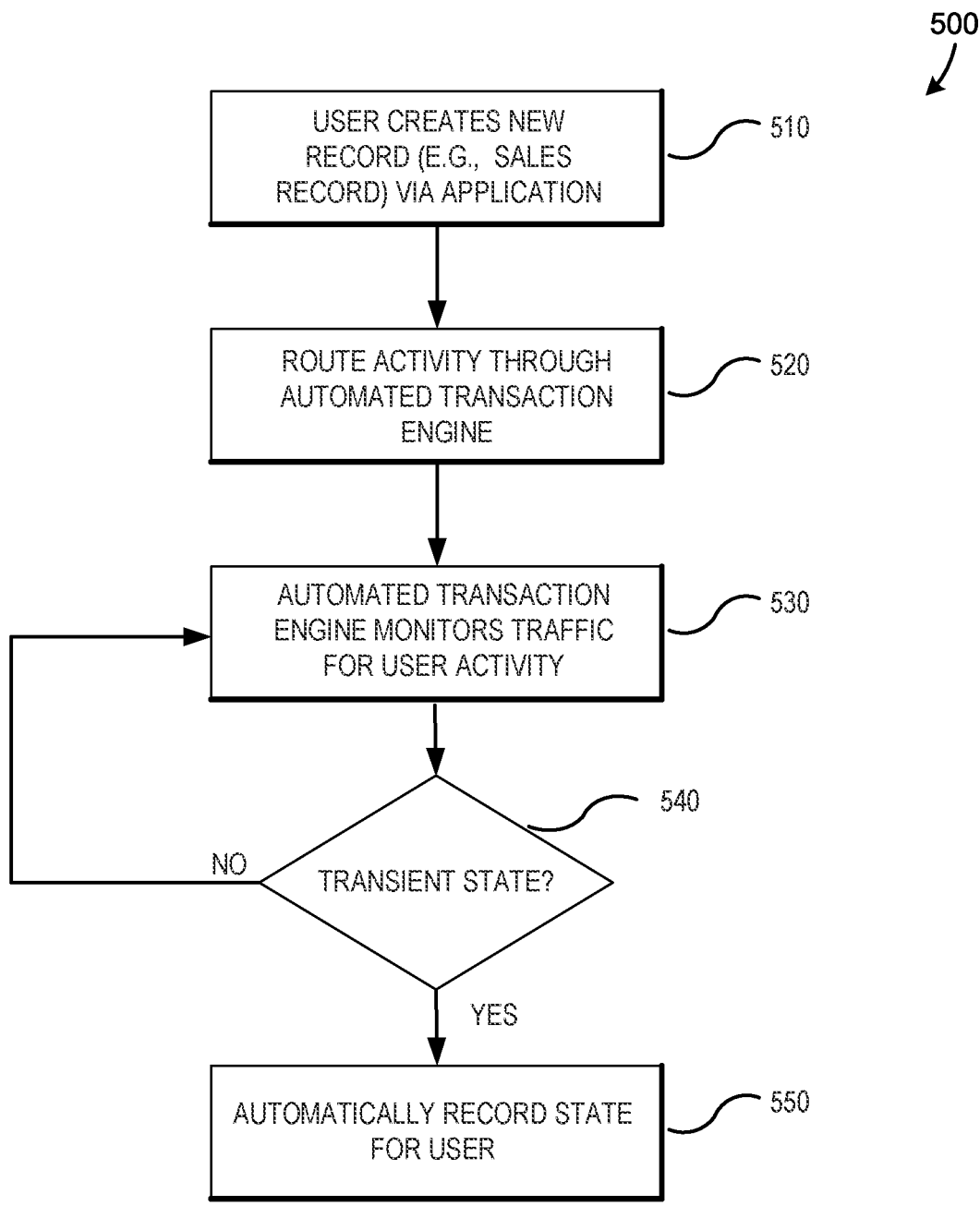
FIG. 5 is a flowchart illustrating a set of operations for operating an automated transaction engine in accordance with some embodiments of the present technology.

FIG. 5 is a flowchart illustrating a set of operations 500 for operating an automated transaction engine in accordance with some embodiments of the present technology. As illustrated in FIG. 5, creation operation 510 allows a user to create a new record (e.g., a sales record) via an application generated by a runtime engine. Routing operation 520 routes the record through the automated transaction engine which can use monitoring operation 530 to monitor the user activity. Determination operation 540 determines whether the record is a transient state (e.g., the record has not been stored other than locally within the application). When determination operation 540 determines that the record is not a transient state, then determination operation 540 branches to monitoring operation 530 to monitor additional user activity and records. When determination operation 540 determines that the record is a transient state, then determination operation 540 branches to recordation operation 550 where the record (or state) is automatically recorded and can be recovered by the application if needed.

Figure 6:
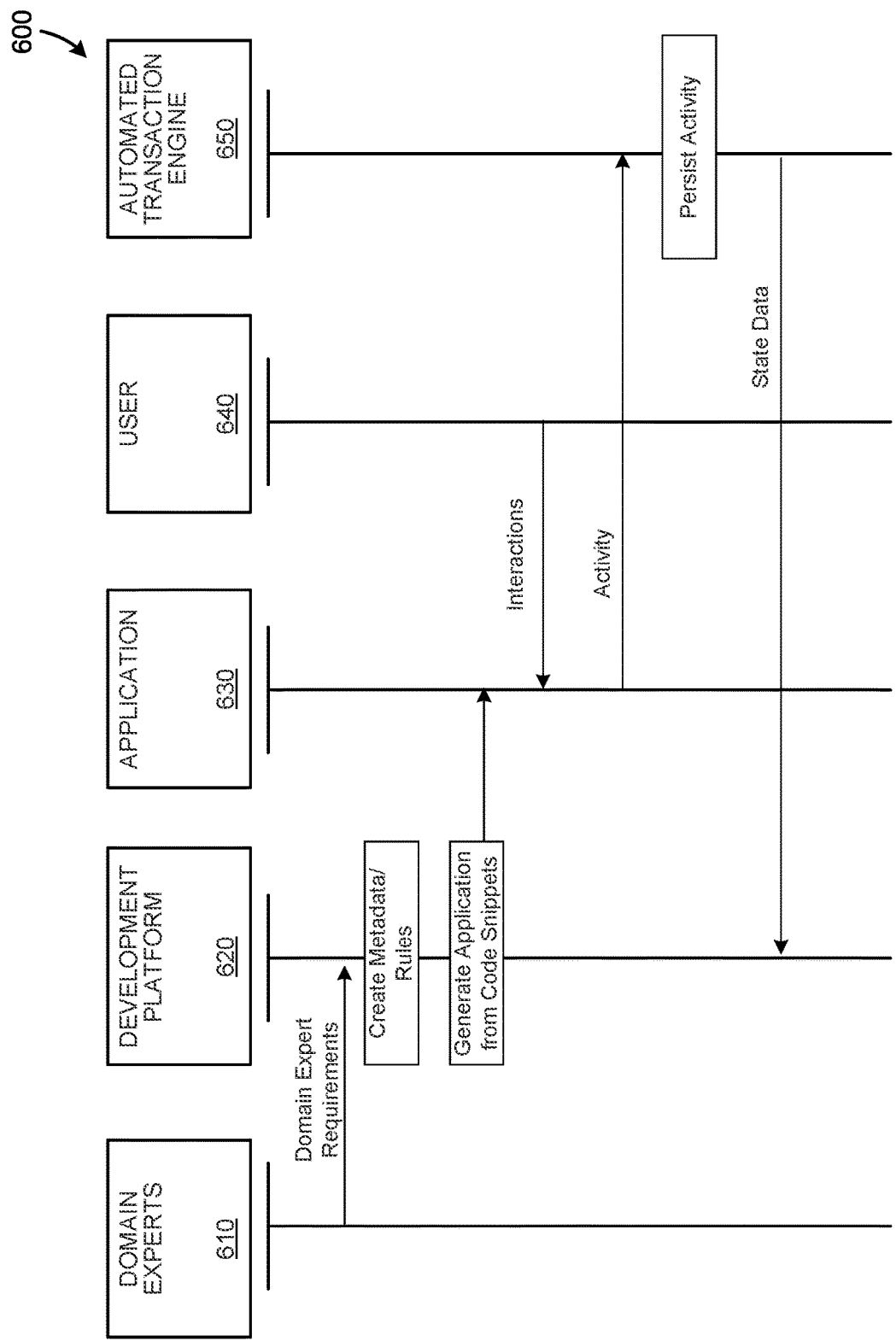
FIG. 6 is a sequence diagram illustrating an example of the data flow between various components that may be used by a software development platform according to various embodiments of the present technology.

FIG. 6 is a sequence diagram 600 illustrating an example of the data flow between various components that may be used by a software development platform according to various embodiments of the present technology. As illustrated in FIG. 6, domain experts 610 can convey various requirements to a development platform. The requirements provided by the domain expert may include stylistic and functional specifications that can be abstracted by development platform 620 into metadata and rules. Using the metadata and rules created from the abstracted requirements, development platform 620 can then generate code snippets and the current version of application 630. Application 630 can be hosted in the cloud (e.g., on one or more servers) or pushed to enterprise devices for access by user 640.

As user 640 interacts with application 630, activity is reported to automated transaction engine 650 which can persist the activity within the application. As a result, if application 630 crashes, the hosting computer loses power, or some other event occurs, then application 640 can request state data from automated transaction engine 650. In response, automated transaction engine 650 can transmit the stat data to application 630 which can return application 630 to the last know state before the failure occurred. As a result, various embodiments of automated transaction engine 650 provide one or more of the following benefits: 1) Work can never be lost—even if a browser client crashes—work is seamlessly saved in the background in a transient state (AUTOSAVE); 2) All business data errors are tracked and the transactions in error can be corrected and resubmitted; 3) Any system errors are also tracked and can be similarly recovered—regardless of availability of 2 phase commit by underlying engine processing transaction; 4) Workflow is integrated by managing the state of any transactions; 5) Other business state (posted/unposted) can be similarly tracked (as part of the workflow system); 6) An audit trail is retained for all state changes; and/or 7) Given the appropriate permissions any transaction or change can be undone or rolled back.

Exemplary Computer System Overview

Figure 7:
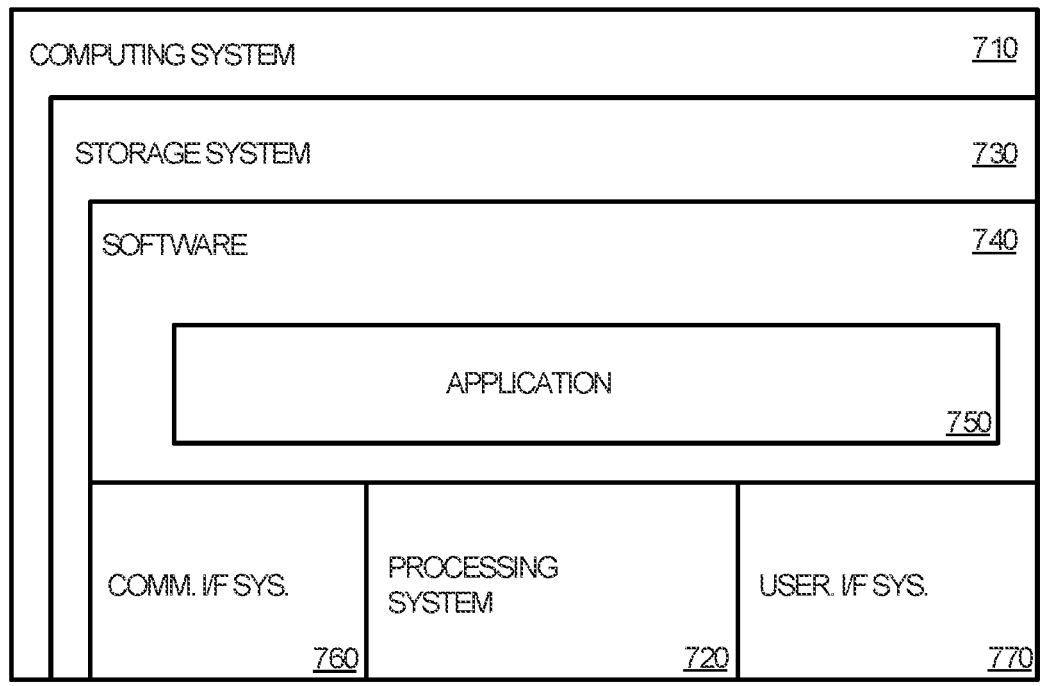
FIG. 7 illustrates an example of a computing system, which is representative of any system or collection of systems in which the various applications, services, scenarios, and processes disclosed herein may be implemented.

FIG. 7 illustrates computing system 710, which is representative of any system or collection of systems in which the various applications, services, scenarios, and processes disclosed herein may be implemented. For example, computing system 710 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 710 may be implemented as a single apparatus, system, or device or may be implemented in a distributed manner as multiple apparatuses, systems, or devices. Computing system 710 includes, but is not limited to, processing system 720, storage system 730, software 740, applications 750, communication interface system 760, and user interface system 770. Processing system 720 is operatively coupled with storage system 730, communication interface system 760, and an optional user interface system 770.

Processing system 720 loads and executes software 740 from storage system 730. When executed by processing system 720 for deployment of scope-based certificates in multi-tenant cloud-based content and collaboration environments, software 740 directs processing system 720 to operate as described herein for at least the various processes, operational scenarios, and sequences discussed in the foregoing implementations. Computing system 710 may optionally include additional devices, features, or functionality not discussed for purposes of brevity.

Referring still to FIG. 7, processing system 720 may comprise a micro-processor and other circuitry that retrieves and executes software 740 from storage system 730. Processing system 720 may be implemented within a single processing device, but may also be distributed across multiple processing devices or sub-systems that cooperate in executing program instructions. Examples of processing system 720 include general purpose central processing units, application specific processors, and logic devices, as well as any other type of processing device, combinations, or variations thereof.

Storage system 730 may comprise any computer readable storage media readable by processing system 720 and capable of storing software 740. Storage system 730 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 730 may also include computer readable communication media over which at least some of software 740 may be communicated internally or externally. Storage system 730 may be implemented as a single storage device, but may also be implemented across multiple storage devices or sub-systems co-located or distributed relative to each other. Storage system 730 may comprise additional elements, such as a controller, capable of communicating with processing system 720 or possibly other systems.

Software 740 may be implemented in program instructions and among other functions may, when executed by processing system 720, direct processing system 720 to operate as described with respect to the various operational scenarios, sequences, and processes illustrated herein. For example, software 740 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 740 may include additional processes, programs, or components, such as operating system software, virtual machine software, or application software. Software 740 may also comprise firmware or some other form of machine-readable processing instructions executable by processing system 720.

In general, software 740 may, when loaded into processing system 720 and executed, transform a suitable apparatus, system, or device (of which computing system 710 is representative) overall from a general-purpose computing system into a special-purpose computing system. Indeed, encoding software on storage system 730 may transform the physical structure of storage system 730. The specific transformation of the physical structure may depend on various factors in different implementations of this description. Examples of such factors may include, but are not limited to, the technology used to implement the storage media of storage system 730 and whether the computer-storage media are characterized as primary or secondary storage, as well as other factors.

For example, if the computer readable storage media are implemented as semiconductor-based memory, software 740 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 760 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 770 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 770. In some cases, the input and output devices may be combined in a single device, such as a display capable of displaying images and receiving touch gestures. The aforementioned user input and output devices are well known in the art and need not be discussed at length here. In some cases, the user interface system 770 may be omitted when the computing system 710 is implemented as one or more server computers such as, for example, blade servers, rack servers, or any other type of computing server system (or collection thereof).

User interface system 770 may also include associated user interface software executable by processing system 720 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 710 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system for providing instances of a stateless application comprising:

one or more databases comprising:
    metadata corresponding to the stateless application, wherein the metadata is representative of stylistic and functional features of the stateless application; and
    transactional data stored in response to user interactions with the stateless application;
a generator configured to:
    obtain the metadata corresponding to the stateless application; and
    generate code snippets based on the metadata; and
a runtime engine configured to:
    instantiate an instance of the stateless application using the code snippets and at least a portion of the transactional data;
    identify one or more transactions that occur within the instance of the stateless application; and
    store the one or more transactions in the transaction database.

2. The system of claim 1, wherein to instantiate the instance of the stateless application, the runtime engine is configured to wrap the code snippets with the at least a portion of the transactional data.

3. The system of claim 1, wherein the runtime engine is further configured to, in the event of a failure of the stateless application, re-instantiate the instance of the stateless application.

4. The system so of claim 1 further comprising an automated transaction engine configured to monitor user activity in the instance of the stateless application and record the one or more transactions.

5. The system of claim 1, wherein the runtime engine provides a set of common services to each instance of the instances of the stateless application.

6. The system of claim 5, wherein the set of common services includes one or more administrative services, one or more application programming interfaces, and one or more security services.

7. The system of claim 1, wherein the generator is further configured to, upon receiving an update:
    determine which of the code snippets are outdated;
    generate updated code snippets; and
    indicate to the runtime engine that the instance of the stateless application needs to be updated using the updated code snippets.

8. The system of claim 1 further comprising an application design tool configured to:
    receive, via a user interface, an indication of the stylistic and functional features for the stateless application; and
    generate the metadata corresponding to the stateless application based at least in part on the stylistic and functional features for the instances of the stateless application.

9. A method for providing instances of a stateless application, the method comprising:
    obtaining metadata from one or more databases configured to store metadata corresponding to the stateless application, wherein the metadata is representative of features of the stateless application;
    generating code snippets based on the metadata;
    instantiating an instance of the stateless application using the code snippets and transactional data, wherein the transactional data is stored in one or more databases configured to store transactional data stored in response to user interactions with the stateless application;
    identifying one or more transactions that occur within the instance of the stateless application; and storing the one or more transactions in the one or more databases configured to store the transactional data stored in response to user interactions with the stateless application.

10. The method of claim 9, wherein instantiating the instance of the stateless application comprises wrapping the code snippets with at least a portion of the transactional data.

11. The method of claim 9 further comprising, in the event of a failure of the stateless application, re-instantiate the instance of the stateless application.

12. The method of claim 9 further comprising monitoring user activity in the instance of the stateless application and recording the one or more transactions.

13. The method of claim 9 further comprising providing a set of common services to each instance of the instances of the stateless application.

14. The method of claim 13, wherein the set of common services includes one or more administrative services, one or more application programming interfaces, and one or more security services.

15. The method of claim 9 further comprising, upon receiving an update:
determining which of the code snippets are outdated;
generating updated code snippets; and
instantiating a new instance of the stateless application using the code snippets.

16. The method of claim 9 further comprising:
receiving, via a user interface, an indication of desired stylistic and functional specifications for the stateless application; and
generating the metadata corresponding to the stateless application based at least in part on the indication of the stylistic and functional specifications for the stateless application.

17. One or more non-transitory computer-readable storage media having program instructions stored thereon for providing instances of a stateless application, wherein the program instructions, when read and executed by a processing system, direct the processing system to at least:
obtain metadata from one or more databases configured to store metadata corresponding to the stateless application, wherein the metadata is representative of features of the stateless application;
generate code snippets based on the metadata;
instantiate an instance of the stateless application using the code snippets and transactional data, wherein the transactional data is stored in one or more databases configured to store transactional data stored in response to user interactions with the stateless application;
identify one or more transactions that occur within the instance of the stateless application; and
store the one or more transactions in the one or more databases configured to store the transactional data stored in response to user interactions with the stateless application.

18. The one or more non-transitory computer-readable storage media of claim 17, wherein to instantiate the instance of the stateless application, the program instructions further direct the processing system to wrap the code snippets with at least a portion of the transactional data.

19. The one or more non-transitory computer-readable storage media of claim 17 wherein the program instructions further direct the processing system to, in the event of a failure of the stateless application, re-instantiate the instance of the stateless application.

20. The one or more non-transitory computer-readable storage media of claim 17 wherein the program instructions further direct the processing system to monitor user activity in the instance of the stateless application and record the one or more transactions.

* * * * *